US012447495B2

(12) United States Patent
Vera et al.

(10) Patent No.: US 12,447,495 B2
(45) Date of Patent: Oct. 21, 2025

(54) DEVICE FOR DIFFUSING VOLATILE SUBSTANCES

(71) Applicant: ZOBELE HOLDING SPA, Trento (IT)

(72) Inventors: Sergio Luque Vera, Barcelona (ES); Roberto Camarero Diez, Barcelona (ES); Fernando Alfonso Gallego, Barcelona (ES)

(73) Assignee: ZOBELE HOLDING SPA, Trento (IT)

(*) Notice: Subject to any disclaimer, the term of this patent is extended or adjusted under 35 U.S.C. 154(b) by 456 days.

(21) Appl. No.: 17/784,421

(22) PCT Filed: Dec. 9, 2020

(86) PCT No.: PCT/EP2020/085379

§ 371 (c)(1),
(2) Date: Jun. 10, 2022

(87) PCT Pub. No.: WO2021/116230

PCT Pub. Date: Jun. 17, 2021

(65) Prior Publication Data

US 2023/0001440 A1 Jan. 5, 2023

(30) Foreign Application Priority Data

Dec. 10, 2019 (ES) .................................. 201931090

(51) Int. Cl.
*B05B 17/06* (2006.01)
*B05B 17/00* (2006.01)

(52) U.S. Cl.
CPC ...... *B05B 17/0684* (2013.01); *B05B 17/0646* (2013.01)

(58) Field of Classification Search
CPC ........................ B05B 17/0646; B05B 17/0684
(Continued)

(56) References Cited

U.S. PATENT DOCUMENTS

2004/0188534 A1* 9/2004 Litherland ........... A61M 11/005 239/4
2006/0011737 A1* 1/2006 Amenos .............. B05B 17/0646 239/102.1

(Continued)

FOREIGN PATENT DOCUMENTS

EP 1474245 A1 11/2004
EP 1596991 A2 11/2005

(Continued)

OTHER PUBLICATIONS

International Search Report to corresponding PCT Application No. PCT/EP2020/085379, mailed Mar. 22, 2021.

(Continued)

*Primary Examiner* — Cody J Lieuwen
(74) *Attorney, Agent, or Firm* — Sandberg Phoenix & von Gontard, P.C.

(57) ABSTRACT

The device for diffusing volatile substances, which comprises a container (1) to house a liquid containing the volatile substances, a capillary element (2) partially housed in said container (1), a perforated element (3) through which volatile substances are diffused, and a piezoelectric element (4) in contact with said perforated element (3) and in contact with the capillary element (2), said piezoelectric element (4) causing the vibration of said capillary element (2), wherein the diffusion device also comprises an elastic element (5) on which said piezoelectric element (4) is mounted, said elastic element (5) being attached to said container (1) or to a housing (6) that surrounds said container (1). Said elastic element allows the piezoelectric element to be perfectly centered with respect to said capillary element.

20 Claims, 2 Drawing Sheets

(58) Field of Classification Search
USPC ........................................................ 239/102.2
See application file for complete search history.

(56) References Cited

U.S. PATENT DOCUMENTS

| | | | | |
|---|---|---|---|---|
| 2011/0315786 | A1* | 12/2011 | Kambayashi | B05B 17/0646 239/102.2 |
| 2014/0151461 | A1* | 6/2014 | Sasaki | B05B 17/0646 239/102.2 |
| 2014/0361095 | A1 | 12/2014 | Haran | |

FOREIGN PATENT DOCUMENTS

| | | | |
|---|---|---|---|
| ES | 2277062 | T3 | 7/2007 |
| WO | 2003068413 | | 8/2003 |
| WO | 2004076069 | A2 | 9/2004 |
| WO | 2005097349 | A1 | 10/2005 |

OTHER PUBLICATIONS

Written Opinion to corresponding PCT Application No. PCT/EP2020/085379, mailed Mar. 22, 2021.

* cited by examiner

DEVICE FOR DIFFUSING VOLATILE SUBSTANCES

The present invention relates to a device for diffusing volatile substances.

BACKGROUND OF THE INVENTION

Electrical systems, powered by cells or batteries, are known for the diffusion of volatile substances. Electric diffusers are devices for diffusing volatile substances in a closed environment, with the use of electrical energy that is used to activate heating elements, diffuser elements or dispensing elements, for the purpose of achieving optimum efficiency, optimum control over the dose and optimum control by the user over the adjustment of the dispensing amount.

This type of devices is specially designed to be used without the need for the cooperation of air currents, and even without specific restrictions on temperature, achieving good evaporation and/or diffusion of volatile substances.

Some of these devices include motors, heaters or solenoid valves that allow the vapors to escape through diffusion or dispensing systems such as nozzles or wicks. These devices are based on a container for the volatile substance, an electrical system that allows diffusion and batteries or cells that power the system.

In some cases, the volatile substance is contained within a container in liquid form, and the electrical system is used to dispense doses by heating to evaporation, by spraying, nebulization, atomization, or other formats.

In other cases, this container is usually presented inside a pressurized metal housing, which acts as a protection and as a support, and which includes the propellant gas of the volatile substance that is intended to be diffused.

Among all the different systems for diffusing active substances, one stands out whose main advantage is the reduced energy required for its operation and therefore longer battery life.

These are electronic devices that feed a perforated metal disc attached to a piezoelectric element that rests on a capillary element that transports the active substance in liquid form from a container or reservoir that is replaced when all the substance is released.

This piezoelectric element vibrates when it is supplied with an alternating supply voltage at a frequency as close to the resonance frequency of the element. This vibration drives the fluid contained in the capillary element through the holes in the metal disc.

The size of the particle is directly proportional to the size of the hole, and the range and flow of the nebulization depends directly on the amplitude with which said piezoelectric element vibrates.

The amplitude of this vibration can be affected by an excess or defect of the pressure exerted by the capillary element on the piezoelectric element.

This variation is the result of the different elements that form the structure that supports them and their variation depending on their different manufacturing processes. Namely, the assembly tolerances, the manufacturing tolerances of the capillary element, the fluid container, the geometric tolerances of the piezoelectric element, etc.

An excess of pressure can cause a decrease in the amplitude of vibration and, therefore, the range and flow would also be consequently reduced, being the extreme case in which the disc could not vibrate at all and, therefore, causing the device to stop working.

On the contrary, a very low pressure, or the absence of contact between the perforated piezoelectric disc and the capillary element, would also result in a reduction in the range and flow rate of the active substance to be diffused.

For this reason, a known solution is the one described in document WO200597349 A1, wherein a spring is added to exert a sufficient, but not excessive, pressure on the piezoelectric disc that rests on the capillary element.

The metal disc has a series of micro-perforations forming a total perforated surface, which is directly proportional to the nebulization flow. The greater the total surface, the greater the nebulization.

A drawback of the device described in this document is that, in order to obtain the best nebulization performance, the capillary element containing the fluid to be nebulized has to completely cover the same perforated surface.

However, said device does not comprise any element that guarantees correct centering between the perforated surface and the surface of the capillary element.

In addition, the presence of metal parts can cause noise, which can be annoying for users of the device.

Therefore, an object of the present invention is to provide a device for diffusing volatile substances that solves the aforementioned drawbacks.

DESCRIPTION OF THE INVENTION

With the device for diffusing volatile substances of the invention, the aforementioned drawbacks are solved, presenting other advantages that will be described below.

The device for diffusing volatile substances according to the present invention comprises:

- a container to house a liquid containing the volatile substances,
- a capillary element partially housed in said container,
- a perforated element through which volatile substances are diffused, and
- a piezoelectric element in contact with said perforated element and in contact with the capillary element, said piezoelectric element causing the vibration of said capillary element,
- wherein the diffusion device also comprises an elastic element on which said piezoelectric element is mounted, said elastic element being attached to said container or to a housing surrounding said container.

According to a preferred embodiment, said capillary element defines a central longitudinal axis, and said elastic element is a body rotating around said central longitudinal axis of the capillary element.

Furthermore, advantageously, said elastic element comprises a hole centered with respect to said central longitudinal axis of the capillary element, where said piezoelectric element is mounted.

For example, said elastic element is a bellows, and the lateral wall of said bellows is curved, defines two sections that form an acute angle, or comprises a plurality of folds, the width of the bellows being smaller towards the piezoelectric element than towards the container.

Preferably, said capillary element is a wick and said elastic element is made of a polymeric material.

According to a preferred embodiment, said piezoelectric element comprises a central deformation, which defines a cavity on its face facing the capillary element.

Said elastic element allows the piezoelectric element to be perfectly centered with respect to said capillary element.

The geometry of said elastic element allows a deformation equivalent to the sum of the manufacturing and assembly tolerances of the elements that characterize the quality and quantity of diffused or nebulized fluid.

Furthermore, this elastic element maintains an adequate pressure to maintain the quality and quantity of diffusion or nebulization within the required parameters.

BRIEF DESCRIPTION OF THE DRAWINGS

For a better understanding of what has been stated, some drawings are attached in which, schematically and only as a non-limiting example, a practical case of embodiment is represented.

DESCRIPTION OF PREFERRED EMBODIMENTS

Figure 1:
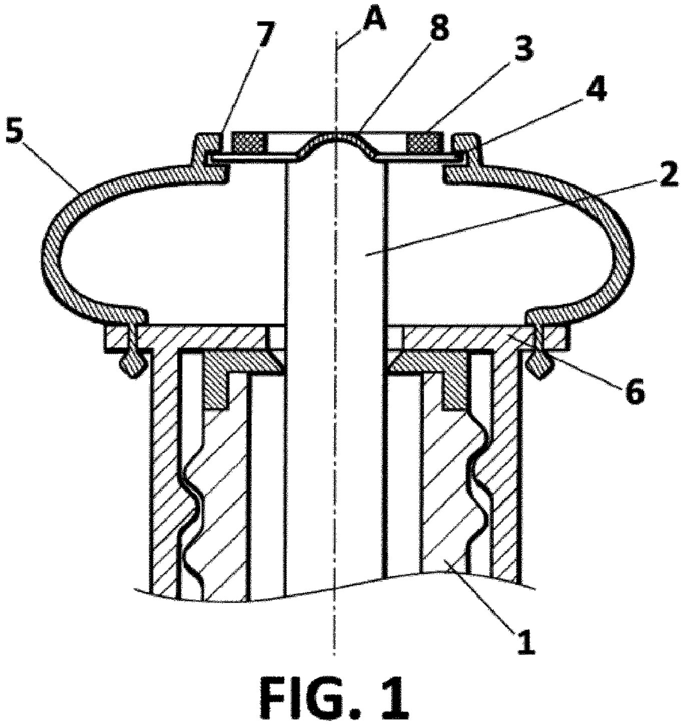
FIG. 1 is a sectional elevation view of the upper part of the device for diffusing volatile substances of the present invention, according to a first embodiment.

As shown in FIG. 1, the device for diffusing volatile substances comprising a container 1 to house a liquid containing the volatile substances, a capillary element 2, such as a wick that is partially housed in said container 1, so that the liquid from the container 1 is moved by capillary action through a portion of the capillary element 2 extending from the container 1 and the housing 6 to the distal end of the capillary element 2 located spaced axially outside the housing and outside the container 1.

The device for diffusing volatile substances also comprises a perforated element 3, for example, a grid, through which the volatile substances diffuse into the environment, and a piezoelectric element 4, such as a piezoelectric disc, which is in contact with said perforated element 3 and with the capillary element 2.

Said piezoelectric element 4 vibrates, transmitting the vibration to the capillary element 2, to increase the evaporation of said volatile substances.

Furthermore, the diffusion device also comprises an elastic element 5, having a distal end on which said piezoelectric element 4 is mounted, said elastic element 5 having a proximal end attached to said housing 6 surrounding said container 1, according to the embodiment shown.

It should be noted, however, that the elastic element 5 could also be attached directly to the container 1. Furthermore, the attachment of the elastic element 5 to the container 1 or to the housing 6 can be performed in any suitable way.

Figure 2:
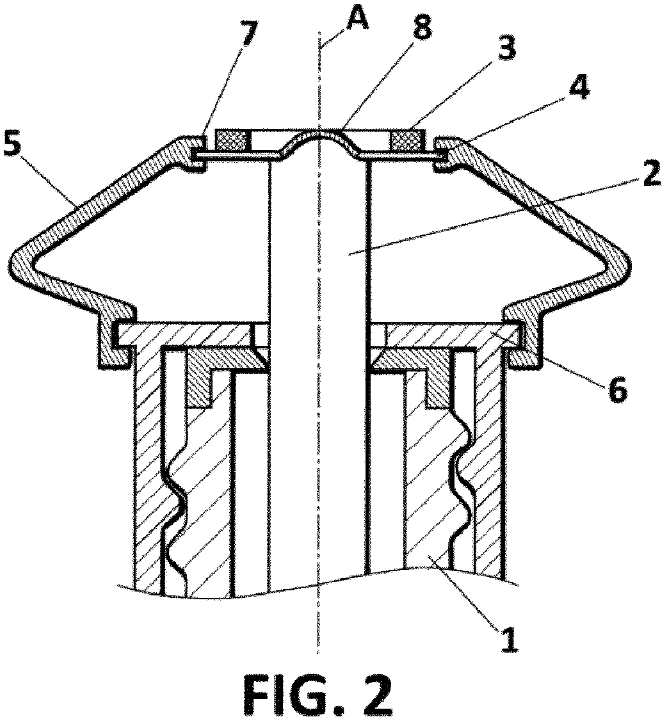
FIG. 2 is a sectional elevation view of the upper part of the device for diffusing volatile substances of the present invention, according to a second embodiment.
Figure 3:
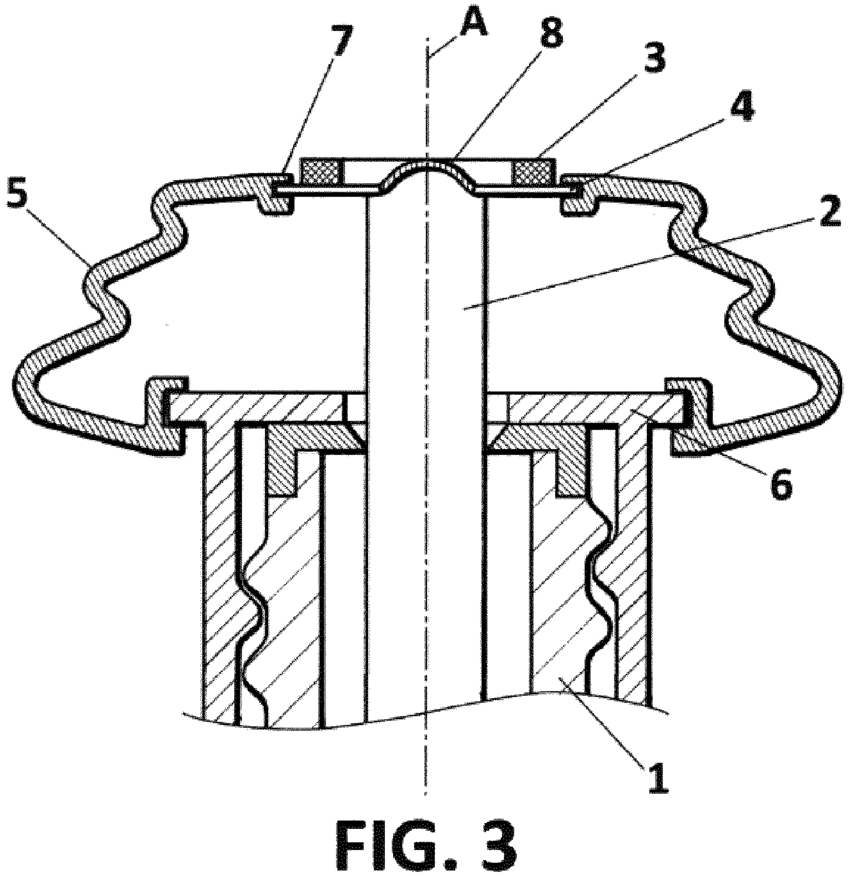
FIG. 3 is a sectional elevation view of the upper part of the device for diffusing volatile substances of the present invention, according to a third embodiment.

Said capillary element 2 defines a central longitudinal axis (indicated A in the figures) and is surrounded by a void space inside the elastic element 5, and said elastic element 5 is advantageously a body rotating around said central longitudinal axis A of the capillary element 2 and extending entirely around and enclosing the void space surrounding the capillary element 2, and having a geometry that allows its deformation when it is subjected to pressure. As shown in FIGS. 1, 2 and 3, the elastic element 5 extends around the void space and encloses the void space surrounding the capillary element 2 as the elastic element 5 extends axially from the proximal end attached to the housing 6 to the distal end attached to the piezoelectric element 4. The configuration of the elastic element 5 axially spaces the piezoelectric element 4 from the housing 6 with the elastic element 5 extending around the void space between the piezoelectric element 4 and the housing 6. The elastic element 5 also forms an enclosure around the capillary element 2 that extends continuously, axially away from the proximal end of the elastic element 5 attached to the housing 6 to the distal end of the elastic element 5 attached to the piezoelectric element 4.

Said elastic element 5, which is preferably a bellows made of an elastic material, comprises a hole 7 which is located centered with respect to said central longitudinal axis A of the capillary element 2, wherein said piezoelectric element 4 is mounted.

To facilitate the transmission of vibration from the piezoelectric element 4, it comprises a central deformation 8, which defines a cavity on its face facing the capillary element 2, as can be seen in the figures.

The geometry of said elastic element 5 allows a deformation equivalent to the sum of the manufacturing and assembly tolerances of the elements that make up the device, which characterize the quality and quantity of nebulized fluid. In turn, this elastic element 5 maintains an adequate pressure to maintain the quality and quantity of diffusion within the required parameters.

According to the first embodiment shown in FIG. 1, the side wall of said bellows 5 is curved.

In FIG. 2 a second embodiment is shown, in which the side wall of said bellows 5 defines two sections that form an acute angle.

For its part, FIG. 3 shows a third embodiment, wherein the side wall of said bellows 5 comprises a plurality of folds, the width of the bellows 5 being smaller towards the piezoelectric element 4 than towards the container 1.

These designs provide different responses to the pressure exerted by the capillary element 2 on the piezoelectric element 4.

Although reference has been made to specific embodiments of the invention, it is clear to a person skilled in the art that the described device for diffusing volatile substances is susceptible to numerous variations and modifications, and that all the mentioned details can be replaced by others technically equivalent, without departing from the scope of protection defined by the appended claims.

The invention claimed is:

1. A device for diffusing volatile substances, comprising:

a container to house a liquid containing said volatile substances, a capillary element partially housed in said container, said capillary element having a central axis that defines mutually perpendicular axial and radial directions relative to said device, a perforated element through which volatile substances are diffused, a piezoelectric element in contact with said perforated element and in contact with the capillary element, said piezoelectric element causing vibration of said capillary element, wherein said device for diffusing volatile substances also comprises an elastic element on which said piezoelectric element is mounted, said elastic element having an attachment to a housing surrounding said container, said elastic element projecting radially away from said attachment of said elastic element to said housing and radially away from said central axis as said elastic element extends axially from said attachment of said elastic element to said housing to a hole in said elastic element that is spaced axially from said housing, and said piezoelectric element is mounted in said hole.

2. The device for diffusing volatile substances according to claim 1, wherein said elastic element is a body rotating around said central axis of the capillary element.

3. The device for diffusing volatile substances according to claim 2, wherein said hole is radially centered with respect to said central axis of the capillary element.

4. The device for diffusing volatile substances according to claim 2, wherein said elastic element is a bellows.

5. The device for diffusing volatile substances according to claim 4, wherein a sidewall of said bellows is axially curved.

6. The device for diffusing volatile substances according to claim 4, wherein an axially extending wall of said bellows defines two sections that form an acute angle.

7. The device for diffusing volatile substances according to claim 4, wherein a sidewall of said bellows comprises a plurality of axially extending folds, and a radial width of the bellows being smaller towards the piezoelectric element than towards the container.

8. The device for diffusing volatile substances according to claim 1, wherein said capillary element is a wick.

9. The device for diffusing volatile substances according to claim 1, wherein said elastic element is made of a polymeric material.

10. The device for diffusing volatile substances according to claim 1, wherein said piezoelectric element comprises a central deformation, which defines a cavity on its face facing the capillary element.

11. A device for diffusing volatile substances comprising:
a housing containing volatile substances;
a capillary element having a central axis that defines an axial direction relative to the device, the capillary element extending axially from the housing to a distal end of the capillary element outside the housing;
a piezoelectric element at the distal end of the capillary element; and
an elastic element connected between the housing and the piezoelectric element, the elastic element extending axially from a connection of the elastic element to the housing to a connection of the elastic element to the piezoelectric element, the elastic element extending radially away from the connection of the elastic element to the housing and radially away from the central axis of the capillary element as the elastic element extends axially from the connection of the elastic element to the housing to a hole in the elastic element that is spaced axially from the housing, and
the piezoelectric element is mounted in the hole.

12. The device for diffusing volatile substances of claim 11, further comprising:
the capillary element extending axially from the housing to the distal end of the capillary element spaced axially outside the housing; and
the elastic element forming an enclosure extending entirely around the capillary element extending from the housing.

13. The device for diffusing volatile substances of claim 12, further comprising:
the elastic element forming an enclosure that is radially spaced outward from the capillary element.

14. The device for diffusing volatile substances of claim 12, further comprising:
the elastic element enclosing a void space containing the capillary element, the void space extending radially between the capillary element and the elastic element.

15. The device for diffusing volatile substances of claim 12, further comprising:
the elastic element extends from the connection of the elastic element to the housing continuously, axially to the connection of the elastic element to the piezoelectric element.

16. A device for diffusing volatile substances comprising:
a housing containing volatile substances;
a capillary element having a central axis that defines an axial direction, the capillary element extending axially from the housing to a distal end of the capillary element outside the housing;
a piezoelectric element at the distal end of the capillary element; and
an elastic element extending axially from a proximal end of the elastic element connected to the housing to a distal end of the elastic element connected to the piezoelectric element, the elastic element surrounding a void space containing the capillary element as the elastic element extends axially from the proximal end of the elastic element to the distal end of the elastic element, the elastic element extending radially away from the connection of the proximal end of the elastic element to the housing and radially away from the central axis as the elastic element extends axially from the connection of the proximal end of the elastic element to the housing to a hole in the elastic element that is spaced axially from the housing, and
the piezoelectric element is mounted in the hole.

17. The device for diffusing volatile substances of claim 16, further comprising:
the elastic element having acute angles formed in the elastic element as the elastic element extends axially from the proximal end of the elastic element to the distal end of the elastic element.

18. The device for diffusing volatile substances of claim 17, further comprising:
the elastic element having a plurality of folds formed in the elastic element as the elastic element extends axially from the proximal end of the elastic element to the distal end of the elastic element.

19. The device for diffusing volatile substances of claim 17, further comprising:
the elastic element enclosing the void space containing the capillary element, the void space extending radially between the capillary element and the elastic element.

20. The device for diffusing volatile substances of claim 17, further comprising:
the elastic element forms an enclosure surrounding the capillary element, the enclosure having a width dimension at the proximal end of the elastic element that is larger than a width dimension at the distal end of the elastic element.

* * * * *